United States Patent [19]

Jones

[11] Patent Number: 4,472,921
[45] Date of Patent: Sep. 25, 1984

[54] CONTROL ARRANGEMENT FOR SKIN PACKAGING MACHINE

[75] Inventor: Stephen H. Jones, LaFrance, S.C.

[73] Assignee: Nordson Corporation, Amherst, Ohio

[21] Appl. No.: 368,635

[22] Filed: Apr. 15, 1982

[51] Int. Cl.³ .................. B65B 11/52; B65B 57/00
[52] U.S. Cl. ................................. 53/52; 53/509
[58] Field of Search ............... 53/509, 52, 64, 427, 53/557, 556; 493/5; 219/494, 492, 497, 385, 413, 532

[56] References Cited

U.S. PATENT DOCUMENTS

| | | | |
|---|---|---|---|
| 4,354,095 | 10/1982 | De Vries | 219/494 X |
| 4,413,172 | 11/1983 | Jones | 53/556 |
| 4,417,432 | 11/1983 | Lee | 53/509 X |
| 4,418,511 | 12/1983 | Collin | 53/509 X |

Primary Examiner—James F. Coan
Attorney, Agent, or Firm—Wood, Herron & Evans

[57] ABSTRACT

A control arrangement for terminating the film-heating segment of a sequence of operations for a skin packaging machine. A skin packaging machine having a film supply, a film-bearing frame, an oven for heating the film in the frame, a base having a perforated surface with means for drawing a vacuum at the surface, and means for moving the frame from a position adjacent the oven to a position adjacent the perforated surface of the base further includes a control arrangement for terminating the heating of the film in the frame by the oven substantially responsive to the temperature of the film. The control arrangement includes a temperature sensor positioned adjacent the film in the frame when the frame is adjacent the oven. The temperature sensor cooperates with a temperature comparison circuit in the control arrangement to provide a comparison between the sensor temperature and a reference temperature to produce a comparison signal. The control arrangement is responsive to the comparison signal to terminate the heating of the film in the frame by the oven. The temperature sensor is mounted at the end of a conduit through which pressurized air is supplied at a set rate for cooling the temperature sensor when the oven is not heating the film.

5 Claims, 8 Drawing Figures

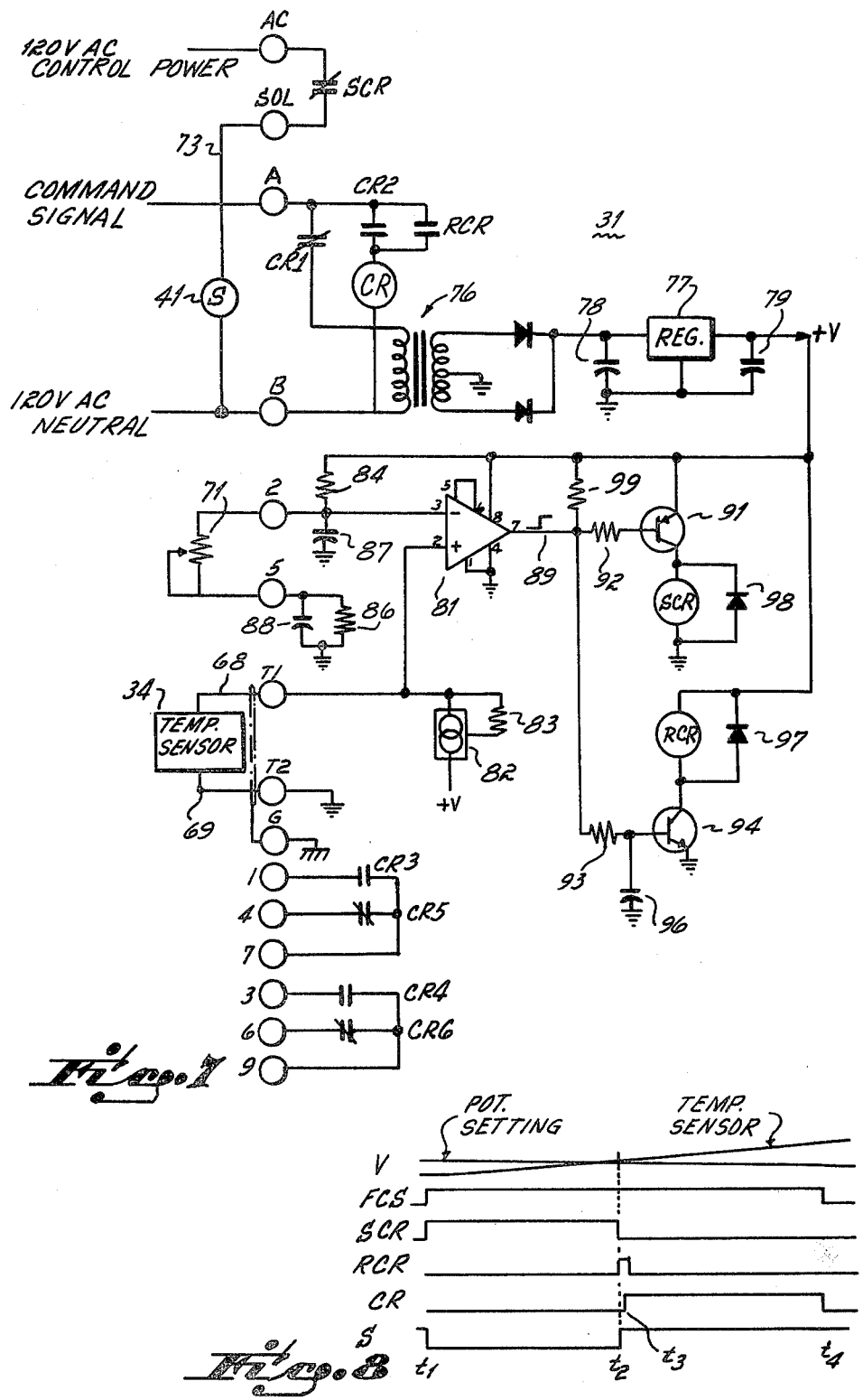

CONTROL ARRANGEMENT FOR SKIN PACKAGING MACHINE

DESCRIPTION OF THE INVENTION

This invention relates generally to a skin packaging machine, and more particularly concerns a control arrangement for such a machine which is substantially responsive to the temperature of the heated film used for the packaging.

A skin packaging machine generally includes a base which has a perforated plate on its upper surface and a source of vacuum for applying a vacuum to the perforated plate. An oven is mounted above the plate and spaced apart therefrom for the purpose of heating a film from a supply roll. After heating, the film is drawn down onto a substrate positioned on the perforated plate in order to surround an article to be packaged on the substrate. A frame for the film is mounted above the base and carries a portion of the film between two jaws which together form the frame. The film is heated in the framce by the oven when the frame is in a raised position adjacent the oven, and the frame is thereafter lowered so that the film in the frame engages the substrate on the base when the frame is in a lowered position. A vacuum is applied to the perforated plate, drawing the film down around the article and substrate to form a package. Then, optionally, air is applied to the perforated plate to "blow off" the package, and the frame is opened to permit removal of the package. When the package is removed, a new supply of film is thereby drawn into the frame. The frame is reclosed, and a knife severs the package from the film in the frame.

In ending the sequence of operation, the film-bearing frame is raised slightly after cutoff of the package. This resets all of the machine controls to enable the next packaging sequence, and the frame is raised adjacent the oven. Typically, the oven is now in a "standby heat" mode and not fully off. The "termination" of heating of the film in the frame shall be discussed herein. In practice, the heaters in the oven of the skin packaging machine are not fully turned off, but rather are maintained in the just-mentioned standby mode. Therefore, "termination" of heating of the film includes a situation where the oven heaters change from a "high heat" mode to a "standby heat" mode.

The next skin packaging sequence is initiated, after loading a product and substrate onto the loading area, by the depression of a "start" button by the operator of the machine. Heaters in the oven are then energized with full power. In a heater system which is timer-based, at the end of a preset period of time, ideally when the film in the frame becomes droopy, the film is lowered, placing the film over the substrate bearing the article of merchandise. This period of time is normally set by an operator of the skin packaging machine using a potentiometer and remains the same for each cycle of the machine.

It has been found that the amount of heat applied to the film during this fixed period of time of heating by the oven will vary. There is a difference in the degree of heating of the film in a fixed period of time between a heating period occuring when the skin packaging machine is first used and a heating period occuring after a series of packaging sequences have been executed. This variation in heating of the film is primarily due to the increased temperature of the film frame and the oven structure after a number of cycles of activation of the oven. Therefore, there is much greater heat transfer to the film in the frame after the skin packaging machine has been in operation for some time, due to an increase in the ambient temperature.

From experience in working with a skin packaging machine, an operator can note when the film in the frame has become appropriately "droopy" indicative that the film has been sufficiently heated to apply to a substrate in a skin packaging operation. Based upon such observations, it has been noted that upon cold start-up, a particular skin packaging machine takes about 26 seconds to properly heat the film in the frame, while after a period of time of operation of the skin packaging machine, only 13 seconds are required to properly heat the film. As can be seen, setting a timer to provide a predetermined period of operation of the oven for heating the film in the frame requires comprising between underheating and overheating the film in certain situations. In particular, if any amount of time longer than that required to heat the film during steady state operation of the machine is preset in the timer, this will increase the amount of energy expended to heat the film beyond that which is necessary. On the other hand, the preselected heating time for the film can be too short for cold start-up operation. In either case, the packages produced can be defective due to improper heating of the film. On the other hand, if the preselected heating time for the film is too short for cold start-up operation, the initial packages produced can be defective due to improper heating of the film.

It has been an objective of the present invention, therefore, to provide a control arrangement for a skin packaging machine for terminating the heating of the film in the frame of the machine which avoids the above-described difficulties. This objective has been accomplished in accordance with certain principles of the invention by providing a control arrangement for a skin packaging machine which terminates the heating of the film in the frame by the oven, substantially responsive to the temperature of the film in the frame, wherein the control arrangement includes means for directing a flow of cooling air upon a temperature sensor which is located near the film during times when an output of the temperature sensor is not being used by the control.

In accordance with another aspect of the invention, a control arrangement is provided which utilizes a temperature sensor in the form of an integrated circuit which is periodically cooled and which cooperates with control circuitry to terminate the heating of the film in the frame of the skin packaging machine substantially responsive to the temperature of the film.

Other objects and advantages of the invention, and the manner of their implementation, will become apparent upon reading the following detailed description and upon reference to the drawings, in which:

FIG. 7 is a schematic diagram of the control circuitry of FIG. 6; and

FIG. 8 is a waveform diagram of certain of the electrical signals in the circuit of FIG. 7.

Figure 1:
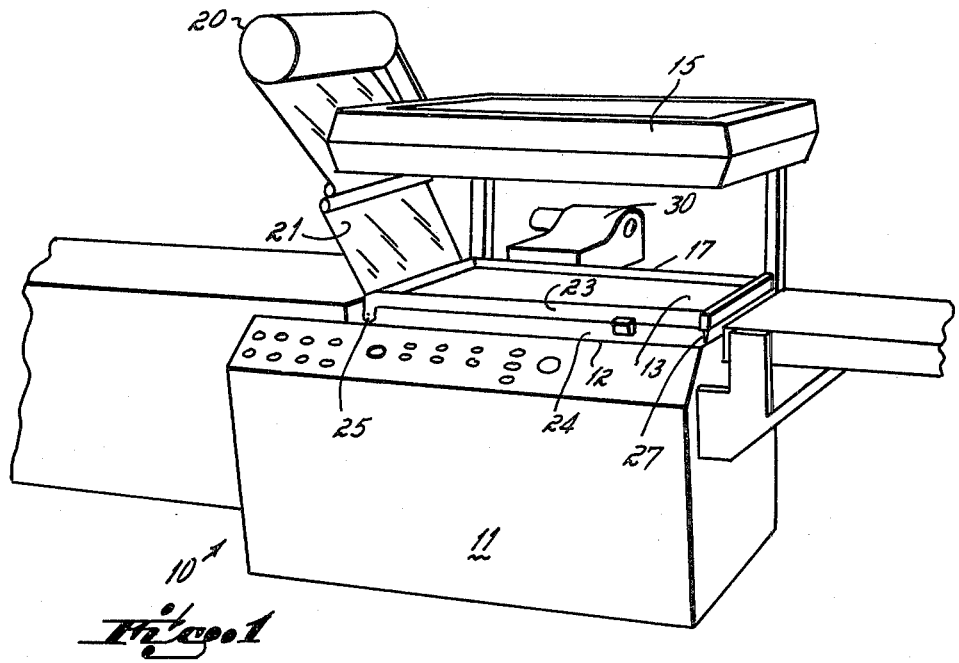
FIG. 1 is a perspective view of a skin packaging machine without the present control arrangement incorporated thereon.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents and alternatives falling within the spirit and scope of the invention as defined by the appended claims.

As shown in FIG. 1, an exemplary skin packaging machine indicated at 10 includes a base 11 presenting a horizontal surface 12 to which vacuum is applied through a perforated surface 13. An oven 15 overlies the perforated surface 13, the oven containing heaters, such as of the type disclosed in U.S. Pat. No. 3,621,200. A rectangular frame 17 is disposed between the vacuum surface 12 and the oven 15 and is provided with a mechanism, not shown but located within the base, for raising and lowering the frame between an upper position adjacent the oven and a lower position adjacent the surface 12.

A supply roll 20 of film 21 is mounted adjacent the oven. The film is adapted to pass between upper jaw 23 and lower jaw 24 of the frame 17. The jaws are hinged at 25 so that they may be opened in order to pull a new supply of film into the frame.

A cutter 27 is provided adjacent the end of the frame remote from the hinge 25 for shearing the film between a finished skin pack package and the fresh film from the supply roll.

Preferably, a fan 30 is provided to blow cooling air across the film during the no-heat required period to permit the oven temperature to remain as hot as possible so as to minimize the time required to raise the temperature to the level required to plasticize the film.

In the operation of the skin packaging machine, as thus far described, a substrate of corrugated board or paperboard bearing an object of merchandise is placed upon the perforated plate 13. The frame 17, with fresh film in it, is positioned in its upper position between the oven 15 and the perforated plate 13. The heat of the oven is applied to the film until it is "ready". In the "ready" state, the film in the frame has become soft and tends to physically droop below the frame. Thereupon, the frame is lowered to its lowermost position in which the film drapes around the object and the substrate which supports the object. A vacuum applied to the substrate pulls the soft film down upon the substrate, whose surface may be treated to adhesively secure the film to the substrate while snugly drawing the product down upon the substrate. This concludes the heating portion of the cycle.

At this point, energy to the oven is greatly reduced to a level which will not degrade a fresh film drawn into the frame even though the fresh film will underlie the oven for a long period of time, for example, 30 seconds. The vacuum turbine is switched off. The jaws of the frame open up. The substrate with the object encased in the plastic film is slid toward the right (as viewed in FIG. 1). In moving the substrate toward the right, a fresh supply of film 21 is pulled between the jaws 23 and 24 of the frame 17. When the substrate is moved completely from beneath the frame, the jaws 23 and 24 close and the knife 27 is reciprocated to sever the film from the skin pack package and the fresh film supply. The frame 17 is then raised to a point underneath the oven and a new substrate with product mounted on it is positioned on the perforated plate. When these operations have taken place, the oven then begins to heat the plastic film to soften it for the next skin pack package.

In the above-described sequence of operations, a typical means for determining when to terminate the heating of the film in the frame by the oven, with the subsequent movement of the frame toward the substrate on the perforated surface, is by the use of a preset timer. As discussed earlier, due to the increase in ambient heat after a member of cycles of operation of the skin packaging machine, the degree of heating of the film in the frame is greater after a period of time of use of the machine than at cold start-up.

An alternative control arrangement, which is substantially responsive to the temperature of the film in the frame, shall be described herein. In the course of the description, the necessary modifications to an exemplary skin packaging machine to provide film heating which is responsive to film temperature shall be described. Thus, the control arrangement for the exemplary skin packaging machine with regard to the temperature sensitive termination of film heating shall be described in detail, while other portions of the control circuit (such as for lowering the frame, etc.) will not be elaborated upon since the particular manner of their implementation is not critical to the practice of the invention.

Figure 2:
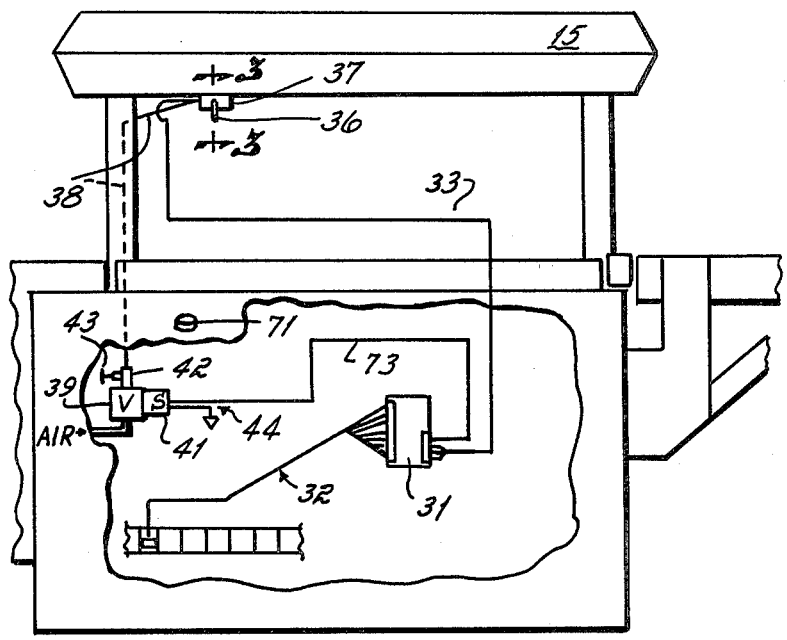
FIG. 2 is a partial, diagrammatic front view of the machine of FIG. 1 showing the control arrangement and the relative positions of its various parts thereon.

Referring now to FIG. 2, the skin packaging machine 10, incorporating the inventive control arrangement, includes a control circuit 31 which receives a "begin heat" command signal. The control circuit 31 also produces command signals to initiate the subsequent segments of the skin packaging sequence of operations. The command signals are carried on conductors in a group of conductors 32. In operation, the control circuit 31 receives a command signal (typically produced by depression of a "start" button by an operator of the machine) to begin the energization of the oven heaters and issues command signals at the termination of the film-heating operation.

Figure 3:
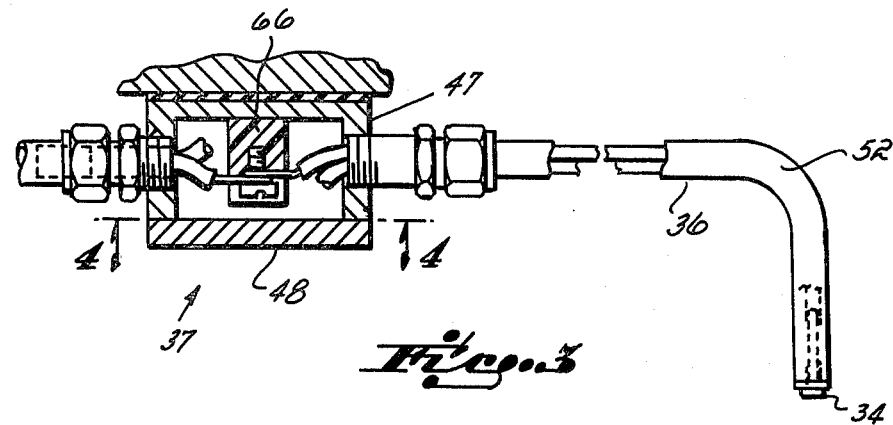
FIG. 3 is a cross-sectional view of a manifold assembly forming a portion of the control arrangement, taken along the line 3—3 in FIG. 2.
Figure 4:
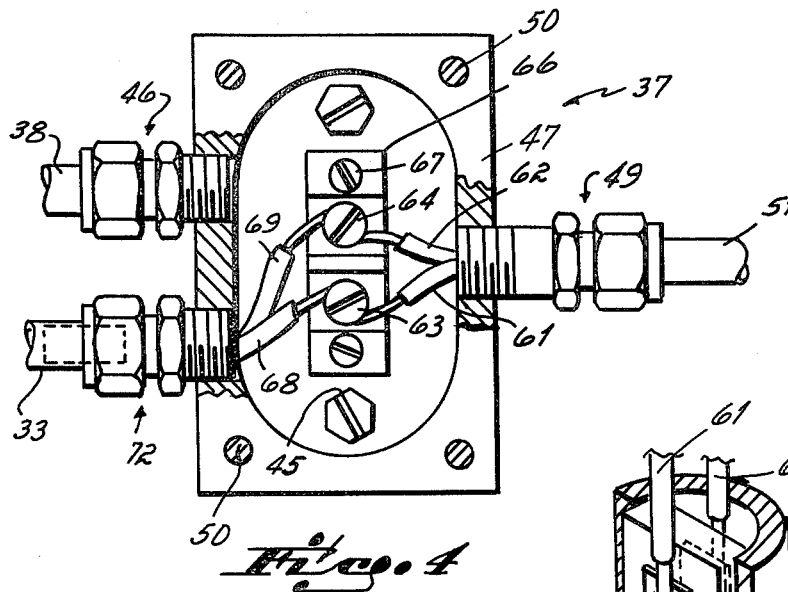
FIG. 4 is a cross-sectional view of the manifold of FIG. 3, taken along the line 4—4 in FIG. 3.

The control circuit 31 is electrically connected by a shielded cable 33 to a temperature sensor 34 (FIG. 3). As shall be described in more detail hereinafter, the temperature sensor 34 is mounted at the end of a conduit 36 which is attached to a manifold assembly 37 mounted on the underside of the oven 15. The temperature sensor is positioned so as to be adjacent to, but not touching, the film in the frame when the frame is in its raised position adjacent the oven 15 for heating.

In order to supply cooling air to the temperature sensor 34, pressurized air flow through an air line 38, the manifold assembly 37, and the tubing 36 past the temperature sensor 34. The air is supplied to the air line 38 through a valve controlled by solenoid 41. The rate of air flow through the valve 39 is set by a needle valve 42 which is adjustable by a valve control 43. The pressurized air is supplied to the inlet of the valve 39 from any convenient source of air utilized with the skin packaging machine. One possible source is the line supplying "blow off" air to the perforated surface.

The operation of the air valve solenoid 41 is controlled by the control circuit 31. In particular, the power to operate the solenoid is supplied over a pair of electrical conductors 44, one of which is connected to the control circuit. The other conductor is connected to "neutral" of the a-c power supply for the machine.

The temperature sensor 34 supplies temperature information concerning the film in the frame to the control circuit 31, which utilizes the temperature information to control the termination of heating of the film in the frame. The temperature sensor 34 is cooled by the above-mentioned air flow substantially during all times other than times at which the oven is heating the film in the frame in order to prevent damage to the sensor. The supply of air is controlled, as shall be discussed in more detail hereinafter, by the control circuit 31 by way of the conductors 44 and the valve solenoid 41.

With additional reference to FIGS. 2-5, in order to supply the cooling air flow to the temperature sensor 34, air is supplied from a pressurized air source (not shown) through the solenoid valve 39, the needle valve 42, and an air line 38 to the manifold assembly 37. The solenoid valve 39 is an on-off valve controlled by the control circuit 31. When this valve is closed, there is no air flow to the temperature sensor, and when this valve is open, there is air flow to the temperature sensor. The rate of air flow is established by the adjustable valve control 43 for the needle valve 42. Depending upon the manual setting of the needle valve control, a selected rate of air flow is supplied to the temperature sensor when the solenoid valve 39 is opened. The rate of flow is selected dependent upon the particular skin packaging machine and its environment, preferably utilizing as low a flow rate as possible wherein the cooling air sufficiently cools the temperature sensor between temperature readings.

The air is supplied to the temperature sensor through an air line 38 leading from the needle valve 42, which is connected to the manifold 37 by a fitting 46. The manifold assembly 37 includes a manifold block 47 attached to the oven by bolts 45. The manifold assembly 37 defines an interior chamber which is enclosed by a manifold cover 48 attached to the manifold block 47 by four screws 50. The pressurized air, at the selected flow rate, flows from the air line 38 through the fitting 46 and the interior chamber of the manifold assembly 37 and then through the rigid tube 36. The tube 36 is coupled at one end to the interior of the chamber by a fitting 49 and at its other end carries the temperature sensor 34. The air, therefore, flows out the end of the tube 36 and around the temperature sensor 34, cooling the temperature sensor.

The tube 36 is bent at a right angle as indicated at 52 so that, when the tube is attached to the manifold assembly 37 and appropriately positioned by the fitting 49, the temperature sensor 34 is located slightly above the film in the frame of the skin packaging machine when the frame is in its position adjacent the oven 15.

In order to mount the temperature sensor 34, and to provide for electrical connections to be discussed hereinafter, the temperature sensor 34 is mounted at the end of a circuit board 53 which is crimped within the end of the tube 36. In order to mount the temperature sensor 34 on the end of the circuit board 53, a first lead 54 is soldered to a conductive strip 56 which is on one side of the circuit board, and a second lead (not shown) is attached to a conductive strip 58 on the other side of the circuit board 53, substantially identical to the conductive strip 56.

In order to maintain the temperature sensor 34 spaced apart from the end of the tube 36, and permit air flow therearound, a pair of outwardly extending shoulders 59 at the lower end of the circuit board 53 engage the bottom edge of the tube 36 to maintain the temperature sensor apart from the lower edge of the tube.

The electrical connection of the temperature sensor 34 to the control circuit of FIG. 7 shall now be described. The temperature sensor leads are electrically connected to the conductive strips 56 and 58, respectively. These conductive strips are in turn electrically connected to a pair of conductors 61 and 62. These conductors extend within the tube 36, through which the cooling air flows, without detrimentally obstructing the air flow through the tube, and are connected at their ends distal from the temperature sensor to a pair of terminals 63 and 64, respectively. The terminals 63 and 64 are mounted on a terminal strip 66, which is attached to the interior chamber of the manifold assembly 37 by a pair of screws 67.

The inner conductors 68 and 69 of the shielded cable 33 extending from the control circuit 31 are connected through a fitting 72 to the terminals 63 and 64, respectively. The interior of the fitting 72 is closed to the passage of air and permits only the passage of the conductors therethrough. Therefore, the cooling air flow from the air line 38 into the interior chamber of the manifold assembly 37 exits only through the fitting 49 to the sensor tube 36.

Figure 6:
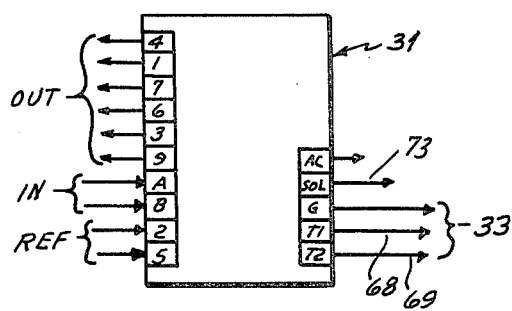
FIG. 6 is a block diagram illustration of control circuitry for the control arrangement showing the electrical connections thereto.
Figure 5:
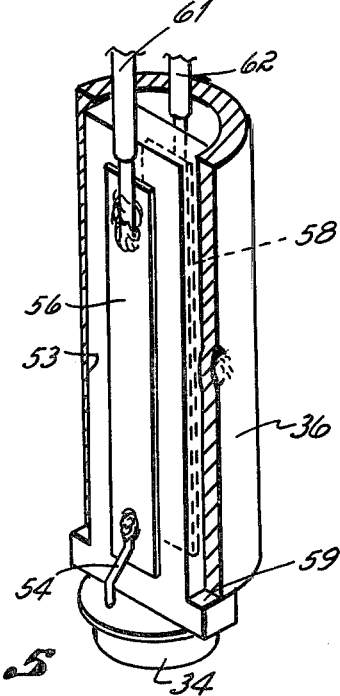
FIG. 5 is an enlarged view, partially in section, of the end of the probe assembly shown in FIG. 3.

The terminals for the various electrical connections to the control circuit 31 are shown in detail in FIG. 6. There are two groups of output terminals, with three terminals in each group. The first group comprises terminals 4, 1 and 7; and the second group comprises the terminals 6, 3 and 9. The signals appearing at these outputs are dependent upon the operation of the control circuit 31 and are used by subsequent control circuits in the skin packaging machine to initiate subsequent segments of the skin packaging machine operational sequence after the film has been heated by the oven. The terminals A and B are input terminals which receive an input control signal indicating that the oven heaters are to be fully activated. The terminals 2 and 5 are input terminals which are connected to a potentiometer 71 (FIGS. 2 and 7) which establishes a reference temperature for comparison with the film temperature measured by the temperature sensor 34 during the heating of the film in the frame.

The AC terminal is connected to, in the exemplary machine, a 120 volt ac control power line. The terminal SOL is connected to one lead 73 from the valve solenoid cable 44. The other lead from the valve solenoid cable 44 is connected at a convenient location in the machine to the 120 volt ac control power "neutral" line. As shall be discussed hereinafter in regard to the control circuit, the ac voltage at the AC terminal of the control circuit 31 is operable to be coupled, in the control circuit, to the SOL terminal to power the air valve solenoid 41 for the cooling air.

The shielded cable 33 from the manifold assembly 37 is connected to the remaining three terminals of the control circuit 31. The cable shield is connected to the G terminal. The two conductors 68 and 69 which are electrically coupled to the temperature sensor 34 are each connected to a different one of the T1 and T2 terminals, respectively.

Referring now to FIG. 7, the circuitry of the control 31 is illustrated with all of the various control circuit terminals discussed above arranged in a vertical column toward the left of the figure. The "hot" line of the 120 volt ac control system power is connected to the AC terminal of the control circuit 31, and the 120 volts ac "neutral" line is connected to the B terminal. This ac power supply connection provides the power for the air valve solenoid 41, a number of controlled relays to be discussed hereinafter, and a dc power supply for some of the control circuitry.

The air valve solenoid 41 is connected to the SOL input of the control circuit 31 by the conductor 73, and the other side of the solenoid 41 is connected to ac "neutral". The command signal to initiate heating of the film in the frame by the oven is applied to the terminal A. The command signal takes the form of a 120 volt ac input coupled between the terminals A and B, with the application of the 120 volt ac serving as the command.

In the illustrated circuit, before the application of a heating command signal, the relay contacts SCR are normally closed; and therefore, the air valve solenoid 41 is activated. This opens the valve 39 (FIG. 2) to supply cooling air through the manifold assembly to the temperature sensor when the oven heaters are not energized.

The control circuitry further serves to turn off the cooling air for the temperature sensor, after a full heat command signal (the initiation of the 120 volt ac signal between the terminals A and B), and then to terminate the heating of the skin packaging film in the frame by the heaters in the oven substantially responsive to the temperature of the film.

The film temperature responsiveness of the control circuit is established by comparing the film temperature, as determined by the temperature sensor, with a reference temperature established by the setting of the operator control potentiometer 71. While the temperature sensor 34 is located adjacent to, but not actually in contact with, the film in the frame in order to prevent adherence of the film to the temperature sensor when it is heated, the temperature measured by the temperature sensor shall be referred to herein as the "film temperature". The temperature measured by the temperature sensor is very closely related to the actual film temperature, and the setting of the "reference temperature" utilizing the potentiometer 71 takes into account the difference between the actual film temperature and the sensor temperature. The potentiometer 71 is preferably set empirically based upon the characteristics of the film and the skin packaging machine being used, further taking into account the observation of the machine operator of the desired "droopy" condition of the heated film in test operations of the machine.

The cable 33 from the manifold assembly 31 (electrically coupled to the temperature sensor 34) is connected to the control circuit, as earlier described, with the shield of the cable being connected to earth, or machine, ground. One lead 69 is connected to a circuit ground through the terminal T2, and the other conductor 68 is connected to the non-inverting input of a voltage comparator 81 through the terminal T1. The circuit ground is isolated from the ac supply by a transformer, as shall be described more fully hereinafter.

A precision current source 82 is coupled to a regulated dc supply, the provision of which is described hereinafter, and supplies one milliampere of current through the temperature sensor 34 at all times that the power supply is energized. In the particular circuit illustrated, the current source is a type LM334 integrated circuit. The biasing resistor 83 to establish the one milliampere current is 68 ohms. The illustrated temperature sensor 34 is a type LM235 integrated circuit, and the voltage comparator 81 is a type LM311 integrated circuit. All of these integrated circuits are available, for example, from National Semiconductor. The temperature sensor 34 includes a calibrating lead which is not used, or illustrated, in the present circuit, and the calibrating lead in practice is clipped off of the integrated circuit.

The entire one milliampere of current produced by the current generator 82 is supplied to the temperature sensor 34 since the current flow into the non-inverting input of the voltage comparator 81 is substantially zero due to its high input impedance. With one milliampere flowing through the temperature sensor 34, the voltage across the temperature sensor is equal to 10 millivolts per °K. Therefore, the sensor voltage would be about 2.73 volts at 0° C. Typically, the highest desired film temperature is about 160° F. or about 75° C. This means that typically the highest voltage of the temperature sensor will be about 3.5 volts.

The reference temperature-setting potentiometer 71 is the middle resistance between a resistor 84 and a resistor 86 in a series connection of the three resistances which is coupled between the dc supply and circuit ground. The resistances are scaled so that the range of the potentiometer is between about 2.7 and 3.6 volts, a range of voltages equal to the expected range of voltages from the temperature sensor 34. Capacitors 87 and 88 are connected between each side of the potentiometer and circuit ground to suppress voltage transients.

The output 89 of the voltage comparator 81 will switch between a logic low (the logic circuit ground) and a logic high (the supply voltage). The inverting input of the voltage comparator 81 is established at a voltage corresponding to a reference temperature by the setting of the potentiometer 71. The reference temperature is the temperature at which the heating of the film in the frame is to be terminated. The voltage at the non-inverting input of the voltage comparator 81 is indicative of the film temperature based upon the output of the temperature sensor 34. When the heating portion of a skin packaging operational sequence is begun, the inverting input of the amplifier is higher than the non-inverting input (since the film temperature is lower than the reference temperature), and the output 89 is low. This output remains low until the film temperature reaches the reference temperature, whereupon the output 89 goes high.

Before the full heat command signal is applied to the control circuit, the relay contacts CR1 are normally closed and the primary of a transformer 76 is coupled across the 120 volts ac applied to the terminals A and B. The output of the secondary of the transformer 76 is utilized to produce a dc (five volts, for example) regulated power supply for the control circuitry, as described hereinafter. In the illustrated circuit, an integrated circuit regulator 77 is used to regulate the dc supply, and two energy storing capacitors 78 and 79 are provided for regulation and for energy storage. As shall be discussed, the capacitors 78 and 79 must store enough energy to insure that a relay (CR) in the control circuit is latched on when the power has been removed from the transformer 76. In one control circuit, the capacitors 78 and 79 are each of a value of 100 microfarads.

When the transformer 76 is energized by the full heat command signal (120 volts ac), and the regulated dc power supply is created, the output of the operational amplifier 81, as outlined above, is low. This is because the film temperature is lower than the reference temperature applied to the inverting input of the voltage comparator 81. This low on the output line 89 of the voltage comparator is applied through a current limiting resistor 92 to the base of a transistor 91, turning on the transistor. The supply voltage is coupled through the transistor 91 and activates a relay SCR. Activating the relay opens the normally closed SCR contacts, which are connected between the AC and SOL terminals of the control circuit. Opening these SCR relay contacts deactivates the air valve solenoid 41, closing the air valve and removing the flow of cooling air from the temperature sensor 34.

As can be seen from the waveform diagram of FIG. 8, therefore, the arrival of the full heat command signal (FCS) at $t_1$ activates the relay SCR, and deactivates the solenoid 41. The oven heaters are energized at substantially the same time as the production of the full heat command signal, and the heaters begin to heat the film in the frame. As shown in FIG. 8, the voltage from the temperature sensor gradually increases as the film is heated, until at a time $t_2$ the sensed temperature reaches the reference temperature. At that time, the output of the voltage comparator 81 goes to a logic high, which turns off the transistor 91 and deactivates the relay SCR. This permits the SCR relay contacts to reclose, reactivating the air valve solenoid 41 and returning the flow of cooling air to the temperature sensor.

At the same time, the logic high at the output 89 permits current to flow through a current limiting resistor 93, as supplied through resistor 99, to the base of a transistor 94. The application of positive voltage to the base of the transistor 94 causes the transistor to conduct current from the voltage supply through a relay RCR to the circuit ground. This activates the relay RCR, which in turn closes the normally open RCR relay contacts which are located in the heater command signal circuit.

In particular, the contacts of the RCR relay, which are now closed, are in series with the control relay CR. The preheat command signal (120 volts ac) is thus applied through the now-closed RCR contacts and the relay CR, activating the relay. The relay CR has six sets of controlled contacts. The contacts CR1 are normally closed to permit the application of the preheat command signal to the transformer 76. These contacts now open when the relay is activated. A second pair of contacts CR2, which are normally open, now close, latching on the relay CR for as long as the preheat command signal continues.

As can be seen, the opening of the contacts CR1 removes the preheat command signal from the transformer 76. As explained earlier, there is sufficient energy stored in the power supply capacitors 78 and 79 to apply sufficient power to the relay RCR to allow the relay CR to latch on at a time $t_3$ through the CR2 contacts. Since the CR2 contacts are in parallel with the RCR contacts, once the power supply falls to a level at which RCR is no longer activated, and the RCR contacts open, this has no effect upon the relay CR which is now latched on through its own contacts CR2.

In the RCR portion of the circuit, a capacitor 96 is coupled between the base of the transistor 94 and the circuit ground to serve as a filter for noise spikes to prevent accidental activation of the transistor 94. In addition, in parallel with both the relay RCR and the relay SCR, there are diodes, 97 and 98, respectively, which are used to suppress transients when the relays are turned off. As shown in FIG. 8, although the relay RCR fairly quickly is deactivated by the decay of the power supply, the relay CR is already latched on by the time $t_3$.

When the relay CR is activated, at about the time that the film temperature has reached the reference temperature indicating that the film is in condition for packaging, four other sets of CR relay contacts are closed. These four sets of contacts are associated with the output terminals which are coupled to the balance of the packaging machine logic circuits. In the particular circuit illustrated, the contacts CR3 and CR4 become closed, and the contacts CR5 and CR6 become opened. This change in the condition of the contacts CR3-CR6 is utilized by subsequent portions of the skin packaging machine logic. The logic circuits coupled to the terminals 1-4-7 and 3-6-9, for example, move the frame downwardly so that the film engages the substrate, reduce the oven heaters to a standby heat mode, and turn off a pilot light to show that the oven has been de-energized from full heat. In the particular machine illustrated, the logic is of a sequential type so that an activating signal is provided by each stage of the machine logic to the succeeding stages. When the operating sequence is complete, all of the various sequential control circuits are reset. For the control circuit 31, at $t_4$ the ac voltage is removed from the terminals A-B during reset. This deenergizes the control relay CR. The ac voltage is then reapplied in the next operational sequence when the heaters are to be energized to heat the film in the frame for the next skin package.

The control circuitry of the present invention replaces a conventional timer system in the illustrated skin packaging machine on a pin-for-pin basis. In a timer-based system, a potentiometer coupled to the terminals 2 and 5 sets the heating time, and the full heat control signal is applied to the terminals A-B to start the timer. Compatible output control signals are produced on the output lines when the timer has timed out.

What is claimed is:

1. In a skin packaging machine having a film supply, a film-bearing frame, an oven for heating the film in the frame, a base having a perforated surface with means for drawing a vacuum at the surface, and means for moving the frame from a position adjacent the oven to a position adjacent the perforated surface of the base, a control arrangement for terminating the heating of the film in the frame by the oven which is substantially responsive to the temperature of the film, comprising;

a manifold assembly, mounted on the skin packaging machine, having a plurality of openings which are in common communication interiorly of the manifold assembly;

a conduit having a first end coupled to a first opening of the manifold assembly and being positioned such that a second end of the conduit is located near the film in the frame when the frame is adjacent the oven;

a temperature sensor mounted at the second end of the conduit such that at least a portion of the second end of the conduit is open;

means for coupling pressurized air to a second opening in the manifold assembly, so that air flows from a source of pressurized air, through the second opening into the manifold assembly, through the first opening in the manifold assembly, through the conduit, and past the temperature sensor; and a control circuit including,
- (a) a temperature comparison circuit electrically connected to the temperature sensor, a part of the electrical connection comprising a plurality of electrical conductors lying inside the conduit, the temperature comparison circuit cooperating with the temperature sensor to provide a comparison between the sensor temperature and a reference temperature to produce a comparison signal at an output of the temperature comparison circuit when the sensor temperature reaches the reference temperature, and
- (b) control circuit means coupled to the output of the temperature comparison circuit and responsive to the comparison signal to produce a control signal to terminate the heating of the film in the frame by the oven.

2. The control arrangement of claim 1 in which the control circuit means produces a control signal to terminate the heating of the film in the frame by the oven which is utilized by further control circuitry to at least reduce the level of energization of the oven.

3. The control arrangement of claim 1 in which the skin packaging machine includes means for energizing the oven to heat the film in the frame, and further comprising pressurized air control means responsive to said energization of the oven, for controlling the pressurized air coupling means to decouple the pressurized air from the manifold when the oven is so energized.

4. The control arrangement of claim 1 in which the temperature sensor is operable to produce at an output a voltage which is directly proportional to the temperature of the sensor.

5. The control arrangement of claim 4 in which the manifold assembly has a third opening, which is substantially closed to the passage of air, and in which the electrical connection between the temperature sensor and the temperature comparison circuit further includes a plurality of electrical conductors extending through the third opening in the manifold assembly.

* * * * *